Figure 1:
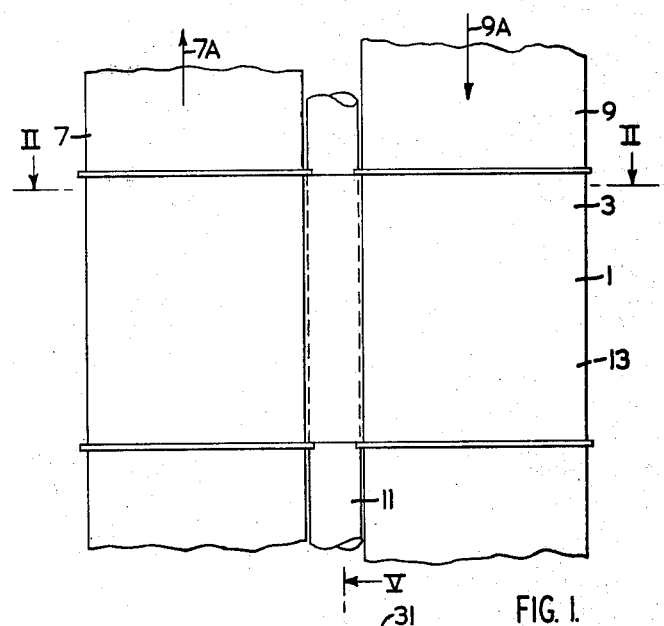

United States Patent [19]
Faris

[11] 3,968,569
[45] July 13, 1976

[54] CLEARANCE MONITORING PROBE FOR ROTARY REGENERATIVE HEAT EXCHANGER

[76] Inventor: Gordon J. Faris, 8004 Booth St., Niagara Falls, Ontario, Canada

[22] Filed: Aug. 27, 1973

[21] Appl. No.: 391,094

[30] Foreign Application Priority Data

Sept. 21, 1972 Canada ................................ 152223

[52] U.S. Cl. ............................................. 33/169 R
[51] Int. Cl.² ......................... G01B 3/22; G01B 5/14
[58] Field of Search .......... 33/169 R, 169 B, 172 R, 33/181 R, 182; 165/9, 11

[56] References Cited
UNITED STATES PATENTS

| | | | |
|---|---|---|---|
| 2,840,918 | 1/1958 | Wildeman | 33/172 R |
| 3,849,893 | 11/1974 | Ormsby | 33/169 B |

FOREIGN PATENTS OR APPLICATIONS

| | | | |
|---|---|---|---|
| 70,203 | 10/1915 | Austria | 33/147 L |
| 702,456 | 1/1954 | United Kingdom | 33/147 L |

*Primary Examiner*—Harry N. Haroian
*Attorney, Agent, or Firm*—Beveridge, DeGrandi, Kline & Lunsford

[57] ABSTRACT

A rotary regenerative air heater for the heating of combustion air by hot waste gases is described. In a rotary regenerative heat exchanger having a rotor carrying heat exchange surfaces and arranged to rotate in a casing so that individual parts of the rotor pass alternately through a hot gas pass and a cool gas pass to effect transfer of heat between the two passes, and sealing elements carried by the rotor engage stationary seal plates to effect a substantially gas-tight seal between the hot gas pass and the cool gas pass, each of the stationary seal plates carries a probe which can be moved beyond the seal plate to engage sealing elements as they pass the seal plate, and means are provided by which a measure can be made of, and/or a control can be effected in accordance with, the spacing between the sealing elements and said seal plate.

3 Claims, 14 Drawing Figures

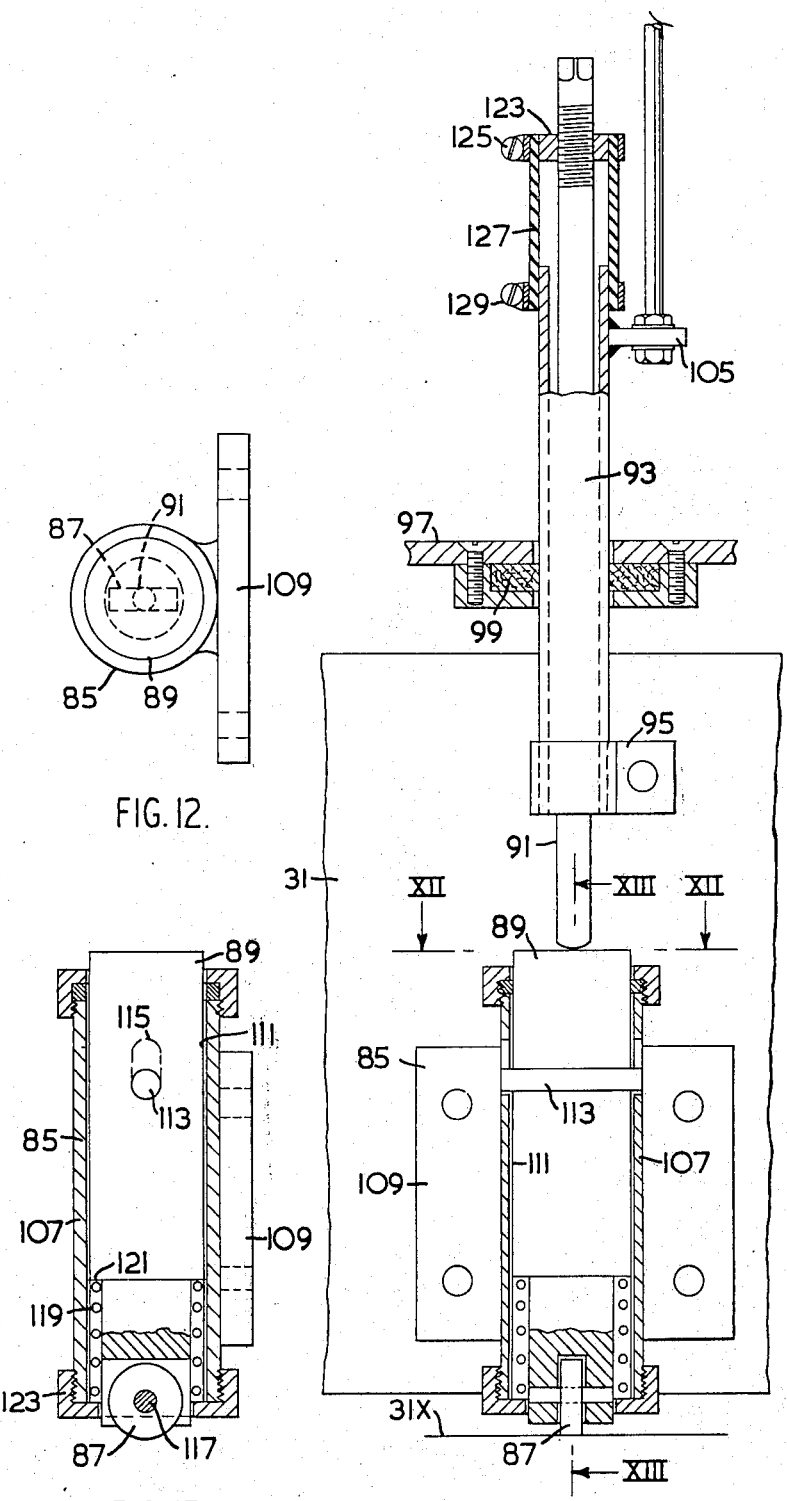

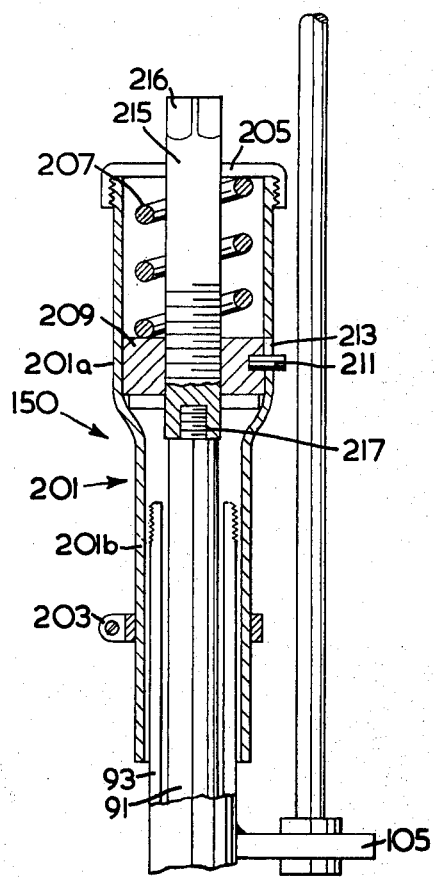

CLEARANCE MONITORING PROBE FOR ROTARY REGENERATIVE HEAT EXCHANGER

This invention relates to improvement in rotary regenerative gas heaters and coolers, for example air preheaters of the Ljungstom type such as are commonly used in power stations for the recovery of heat from waste gases and the transfer of that heat to combustion air passing to burners of the furnaces of steam generating and superheating units.

In such rotary regenerative air heaters, a cylindrical housing contains a coaxial rotatable assembly of disc like elements, the arrangement being such that hot waste gases are passed through a first sector of the housing, air to be heated is passed through a second sector of the housing, and the assembly is rotated at say 2 or 3 revolutions per minute so that each part of each disc like elements passes alternately through the first sector and second sector, so that it absorbs heat from the hot waste gases in passing through the first sector, and gives that heat up to the combustion air in passing through the second sector.

It will be appreciated that, in order to prevent the flow of gases between the first sector and the second sector, it is necessary to provide seals which are substantially gas tight. However, in view of the large size of the air heater, the cylindrical housing typically having a diameter of 34 feet, considerable thermal expansion takes place as the air heater warms up to operating temperature, and this causes changes in clearance between the various moving parts which make it difficult to provide a satisfactory seal.

An object of the present invention is the provision of an improved rotary regenerative heat exchanger in which protection is provided against excessive changes in clearances between sealing elements carried by a rotor and a sealing plate engaged by said sealing elements.

According to the present invention, in a rotary regenerative heat exchanger having a rotor carrying heat exchange surfaces and arranged to rotate in a casing so that individual parts of the rotor pass alternately through a hot gas pass and a cool gas pass to effect transfer of heat between the two passes, and sealing elements carried by the rotor engage stationary seal plates to effect a substantially gas-tight seal between the hot gas pass and the cool gas pass, at least one of the seal plates carries a probe which can be moved beyond the seal plate to engage sealing elements as they pass the seal plates and means are provided by which a measure can be made of, and/or a control can be effected in accordance with, the spacing between the sealing elements and said seal plate.

Figure 2:
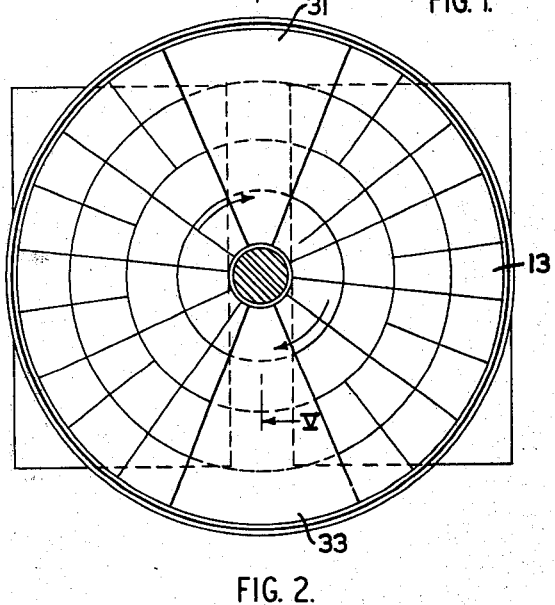
Figure 3:
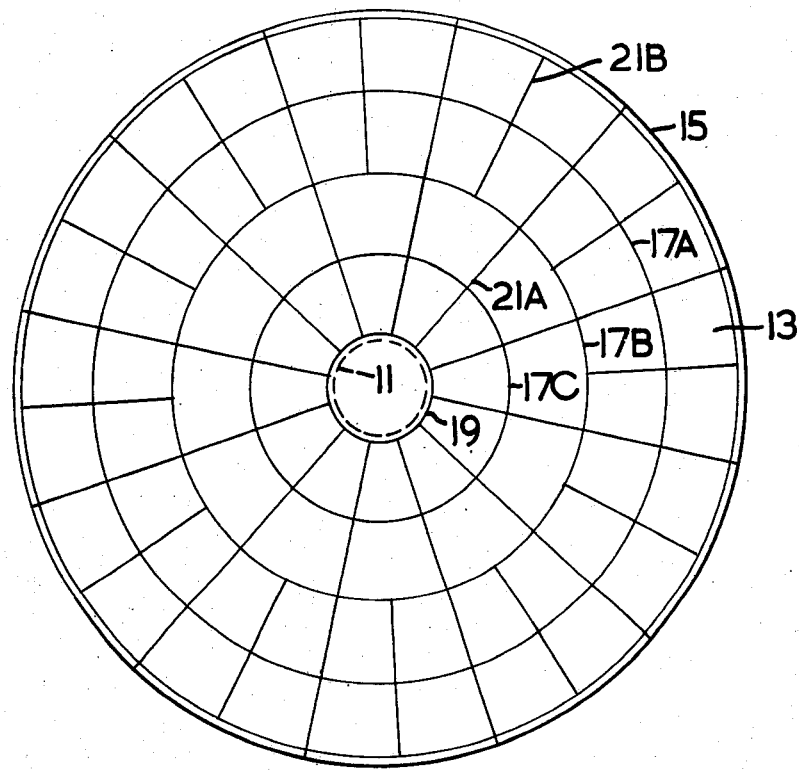
Figure 4:
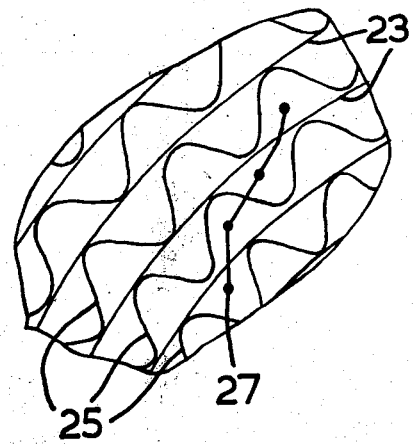
Figure 5:
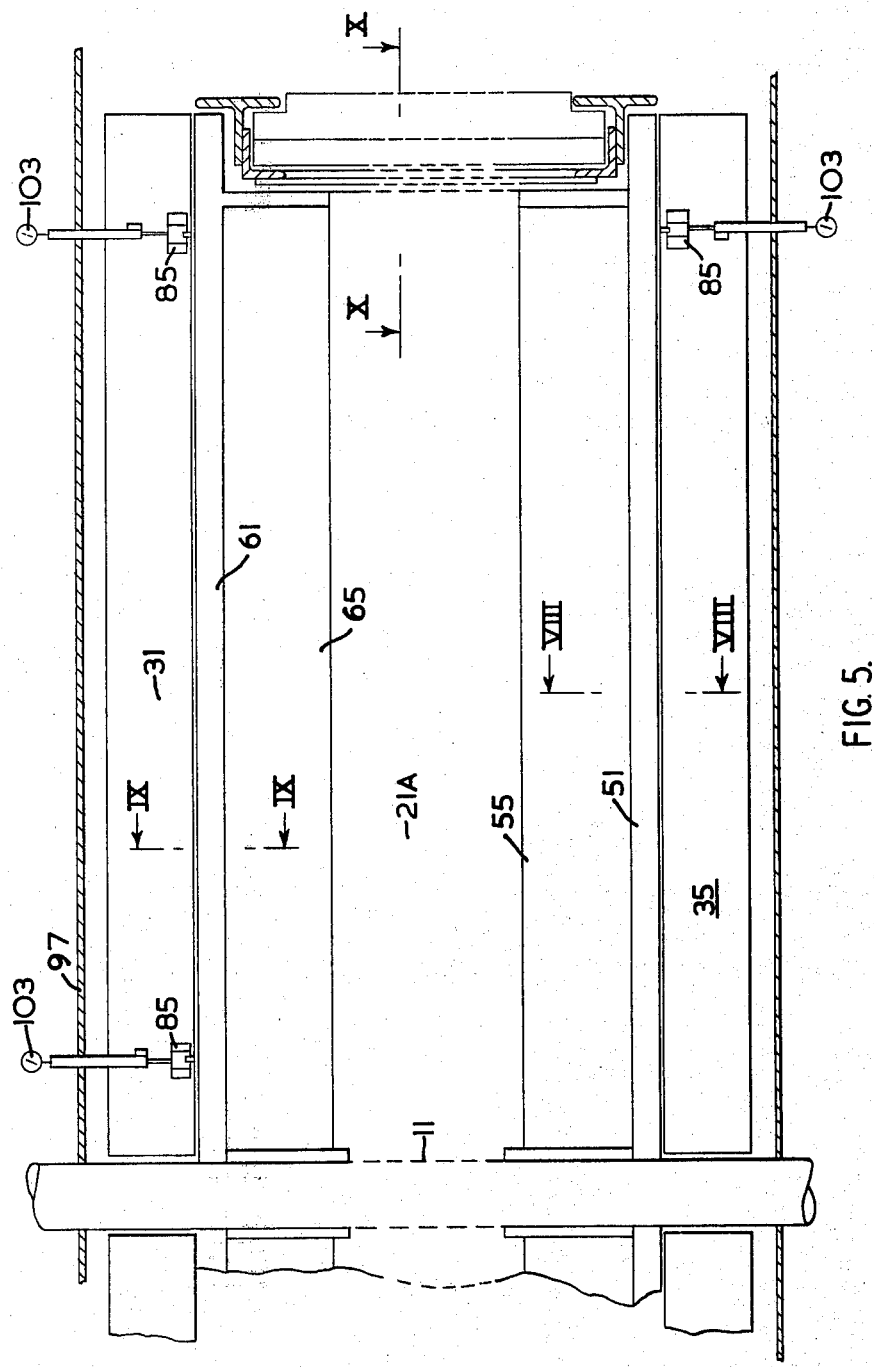
Figure 6:
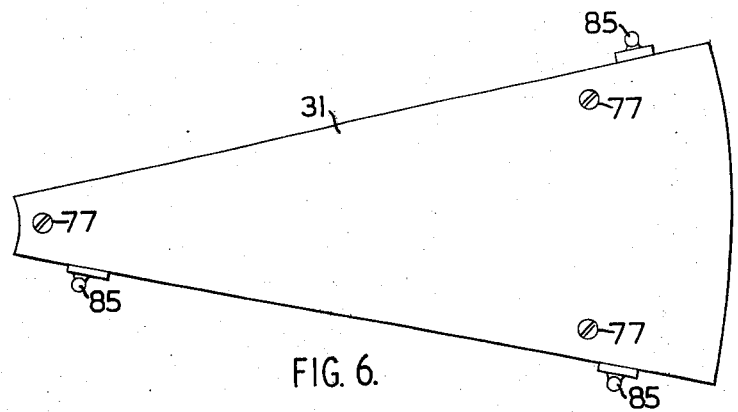
Figure 7:
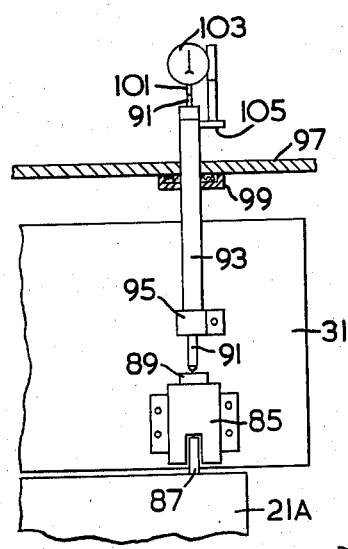
Figure 9:
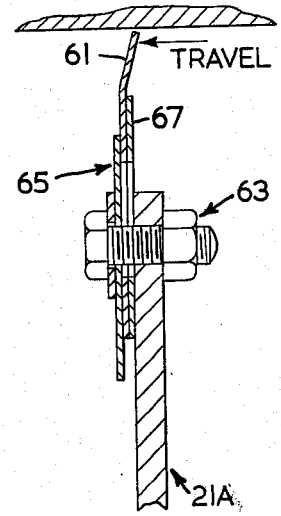
Figure 8:
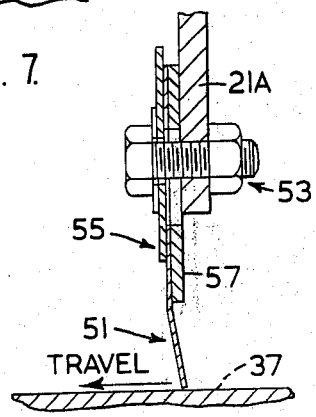
Figure 10:
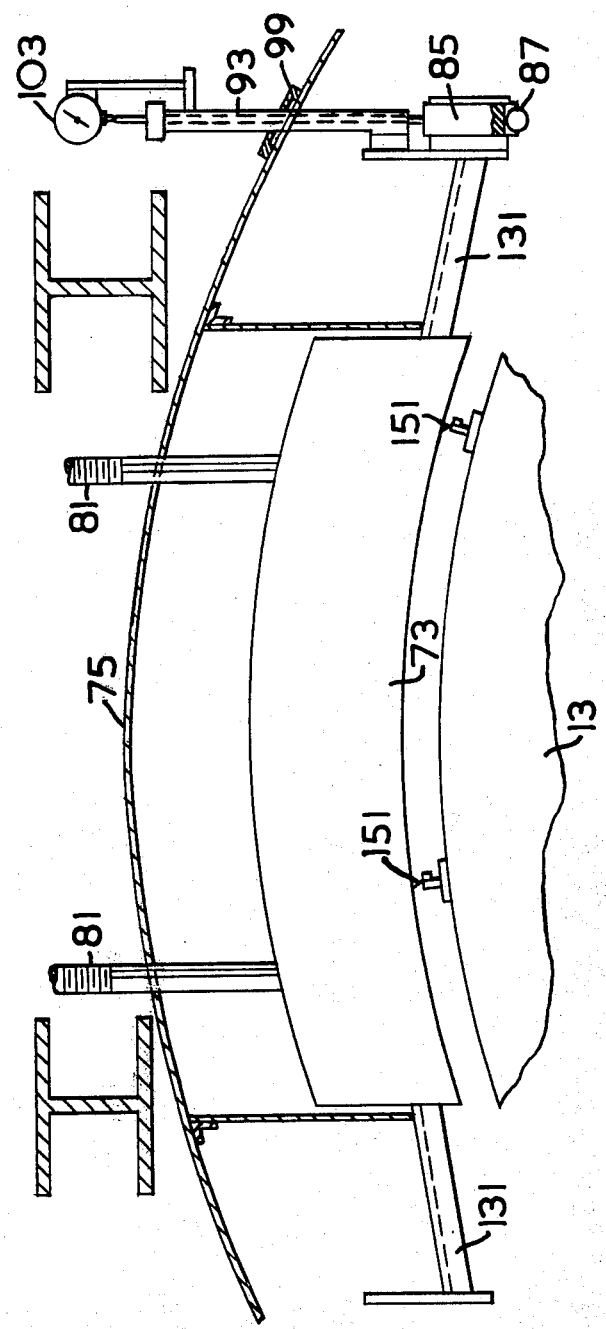

The invention will now be described, by way of example, with reference to the accompanying drawings, in which:

FIG. 1 is a front elevation of a rotary regenerative heat exchanger;
FIG. 2 is a sectional plan view taken on the line II—II of FIG. 1;
FIG. 3 is a plan view of a rotor shown in FIGS. 1 and 2;
FIG. 4 is a fragmentary drawing in the form of a plan view of a small part of the rotor of FIG. 3;
FIG. 5 is a sectional side elevation taken on the line V—V of FIG. 2;
FIG. 6 is a plan view of a sealing sector plate shown in FIG. 5;
FIG. 7 is a side elevation of the right-hand end of a sealing sector plate shown in FIG. 5;
FIG. 8 is a sectional elevation taken on the line VIII—VIII of FIG. 5;
FIG. 9 is a sectional side elevation taken on the line IX—IX of FIG. 5;
FIG. 10 is a plan view taken on the line X—X of FIG. 5;
FIG. 11 is a sectional side elevation of a clearance monitoring device shown in FIG. 7, but drawn to a larger scale than that Figure;
FIG. 12 is a plan view taken on the line XII—XII of FIG. 11;
FIG. 13 is a sectional front elevation taken on the line XIII—XIII of FIG. 11; and
FIG. 14 shows an alternative construction for the upper part of the tube 93 in FIG. 11.

Referring first to FIGS. 1 and 2, these show a rotary regenerative air pre-heater 1, consisting of a cylindrical casing 3 arranged with its axis vertical, and on one side of its central vertical plane connected into a hot gas duct 7 and on the other side of that plane connected into a cold air duct 9. In the hot gas duct 7, hot gases flow upwards as indicated by the arrow 7A, and in the air duct 9 air being pre-heated, flows downwardly as indicated by the arrow 9A. Extending axially through the casing 1 is a vertical shaft 11, and mounted on the shaft is a regenerative heat transfer rotor 13 driven at about 1.8 revolutions per minute, each area of which is subjected alternately to heating by the hot gases and to cooling by the cold air. In this manner, heat is extracted from the hot gases and heat is added to the cold air. The rotor is driven by an electric motor (not shown) through a large gear extending into a pin rack on the outside of the rotor. Such air heaters are well known in the industrial field, being referred to generically as Ljungstrom air heaters, and find wide use in the heating of combustion air by waste furnace gases, in steam generating units. The casing 3 is large, and typically has a diameter of between 12 feet and 40 feet.

As is shown most clearly in FIG. 3, the rotor 13 includes a cylindrically formed circumferential wall 15 and three concentric cylindrically formed baffles 17A, 17B and 17C of different diameters. In addition, a cylindrical inner wall 19 surrounds the shaft 11. The annular spaces between the walls 15 and 19 and the baffles 17A, 17B and 17C are divided by radial partitions 21A which extend from wall 15 to wall 19 and by interposed shorter partitions 21B which extend only from wall 15 to the central baffle 17B. Between these partitions, the rotor consists of assemblies of cylindrically curved plates 23 and corrugated plates 25, the arrangement being shown in FIG. 4, which shows the arrangement in a small part of one of the spaces bounded by the various walls, baffles and partitions, and is drawn to a much larger scale than FIG. 3. It will be seen that plates 23 and 25 define thousands of gas or air flow passages 27 of relatively small cross sectional area, and bounded by the metal surfaces of the plates for good heat exchange between the plates and the air or gas.

In a typical installation, a primary heater heats air going to coal pulverising mills, and a secondary heater heats air to be used for combustion, and differences in construction exist between the two types of heaters. As far as possible, air and gas flow between the ducts must be minimised, and in view of the pressure difference between the two ducts, some form of seal must be provided to cooperate with the rotor. To provide general isolation between the two ducts, i.e., to prevent gas flowing into passages 27 from venting into the air duct, and vice versa, the passages in the vicinity of the demarcation zone between the two air ducts are blanked off (see FIG. 2) by sector seal plates 31 and 33 at the top end of the rotor, and by similar sector seal plates 35 and 37 at the bottom of the rotor.

Although these plates reduce considerably the interduct flow of gas and air, it is necessary to provide additional gas seals, namely between the wall 15 and the adjacent parts of the duct, and between the sector plates and the upper and lower edges of the rotor.

The locations of these seals is indicated in FIG. 5 by the section lines referring to FIGS. 8 through 10, and those Figures indicate the form these seals typically take. There are twelve of the radial partitions 21A, and these are usually referred to as "diaphragms". Associated respectively with the top and the bottom of each of these are two sealing elements. Thus, referring to FIG. 8, this shows the sealing element along the bottom of a diaphragm, the sealing element consisting of a flexible sealing strip 51 clamped to the diaphragm 21A by a series of bolts 53, sectionalized support plates 55 and 57 being provided on opposite sides of the sealing strip. The sealing strip travels in the direction indicated by the arrow, and is bent backwardly at 12 degrees as shown so as to trail. The main support plate 57 is on this trailing side, and this support plate and the sealing strip are slotted so that they can be adjusted towards and away from the associated sector plate.

FIG. 9 relates to the upper flexible sealing strip 61 with its support plates 65 and 67, held in place on partition or diaphragm 21A by bolts 63.

FIG. 10 shows a stationary vertical seal plate 73, and it will be seen that it is disposed inside the main shell 75 of the heat exchanger.

When a heat exchanger with such seals is put in use, the various parts expand to different degrees, mainly due to the differences in operating temperatures of say the rotor and the casing. Further, at the temperatures often used, the natural droop or sag of parts away from their point of support is greater than when the heat exchanger is first installed. As a result, parts which were previously in light rubbing engagement could come into firm contact and damage tends to result. Provision is therefore made for adjusting the sector plates 31, 33, 35 and 37 vertically, and for adjusting the cylindrically curved plate 73, and its companion plate adjacent the diametrically opposite pair of sector plates, in a horizontal direction towards and away from the rotor. Thus, as shown in FIG. 6, the upper sector plate 31 is provided with one inner and two outer adjusting rods 77 which at their lower ends are secured to the sector plate and at their upper ends are screw threaded and are engaged by nuts abutting fixed parts of the frame of the air heater. Similarly, the plate 73 is provided with two adjusting rods 81 near its upper end and two similar adjusting rods (not shown) near its lower end. Since these sector seal plates are adjustable, the term "stationary" as applied to these plates will be understood as meaning normally stationary, although the plates can be adjusted while the regenerator is operating.

By means of these various adjustments, it is possible to set up the various sealing strips and section seal plates and plates 73 so that initially the various clearances are acceptably small, and so that during prolonged operation the anticipated expansions and sagging effects are allowed for.

What has been described so far is a typical heat exchanger of the rotary regenerative type, and no claim is made regarding the features of structure so far described. The novel features of the present invention relate to the manner in which the various expansions and movements between the rotor and the surrounding parts are accommodated.

Serious damage has been caused in the past to large air heaters when the predicted expansions and "sagging" is not realised in operation. Although the speed of rotary movement is relatively small, the mass of the moving parts is considerable, and any touching or rubbing of the parts can cause major damage and possibly wreck the air heater. By the present invention, means are provided which enable the operator to check, during operation of the air heater, the clearances existing at critical areas in the air heater. The clearances involved are small, and typically would be 0.001 inch.

Referring first to FIG. 5, this figure shows three devices 85 disposed respectively on the upper sector plate 31 near the shaft 11, on the upper sector plate 31 near its outer end, and on the lower sector plate 35 near its outer end. Referring now to FIG. 7, it will be seen that device 85 is mounted on plate 31 by suitable dowels, and carries a roller 87 which engages the sealing strip of each diaphragm or partition 21A as it passes under the device 85. Device 85 includes a vertically movable plunger 89 on which can press the bottom of a rod 91 extending upwardly through a tube 93 clamped at its lower end by a clip 95 to the plate 31. This tube 93 extends up through an upper casing wall 97 through a compression type gas seal 99. Above wall 97, the rod 91 emerges from the top of the tube and engages the anvil 101 of a dial type micrometer gauge 103. Gauge 103 is mounted on a lug 105 welded to the side of the tube 93.

FIGS. 11, 12 and 13 show the details of device 85 to a larger scale, and it will be seen that the device includes a housing 107 provided with a mounting flange 109 and a cylindrical bore 111 in which the plunger 89 can slide. Rotation of the plunger relative to the housing is prevented by a transverse pin 113 carried by the plunger and fitting into axial slots 115 formed in the housing. The roller 87 is carried on a pin 117 in a lower part of the plunger of reduced diameter, and a compression spring 119 acts between the resulting shoulder 121 on the plunger and a cap 123 screwed onto the bottom end of the housing. It will be seen that spring 119 normally presses the plunger upwardly out of engagement with the sealing strips carried by the rotor, but rod 91 can be used to press the roller 87 down until it is engaged by the sealing strips. As shown in FIG. 11, the rod 91 near its upper end is screw threaded and fits into a nut member 123, which is clamped by a pipe clamp 125 into a short length of stiff rubber hose 127, the lower end of which is clamped by a second pipe clamp 129 to the upper end of pipe 93. The upper end of the rod is squared for engagement by a suitable spanner.

In use of each of the devices 85, before the air heater is put into operation the bottom of roller 87 is brought into exact alignment with the lower surface 31X of the sector plate 31 by rotation of the rod 91 in the nut member 123. The gauge 103 is then adjusted to read O.

When the air heater has been running for some time, and it is desired to check the working clearance between the selected device 85 and the sealing strip, the operator screws down the rod 91 through the nut member 123 until contact is felt with each sealing strip as it passes and engages the roller 87. The resiliency of hose 127 allows roller 87 to rise slightly when contacted by a strip, avoiding damage to the strip. The reading on the micrometer gauge then indicates the distance the sealing strip is below the lower edge of the sector plate 31. If necessary, the sector plate 31 can be vertically adjusted by means of the adjusting rods 77 to correct the working clearance.

Since the pipe 93 is mounted only at its lower end, and there only by one bolt, the pipe can tilt relative to the plate 31 to accommodate any radial tilting of the sector plate which may prove necessary in adjusting the three rods 77.

FIG. 10 shows a further device 85 used to monitor the clearance between the plate 73 and the sealing strips 151 on the rotor 13, called axial seals, as they pass, and although only one is shown, it will be appreciated that suitably four are provided, one near each corner of the plate 73. In order to provide room to accommodate these extra four devices 85, they are mounted on the plate 73 respectively by arms 131. Their manner of use is similar to that described above for the devices 85 carried by the sector plates.

It will be seen that by the provision of the devices 85 it is possible for an operator to monitor the clearances involved, and make any necessary corrective adjustments, before any serious damage can arise. The apparatus described has purposely been kept very simple, in order to avoid the likelihood of any malfunction during extended use in the adverse conditions which exist in a steam generating plant. However, without departing from the principles of the invention, more complex arrangements can be conceived. Thus, alarm means can be associated with the gauges 103 to detect any undue variation in the measured clearance. Further, the rollers 87 could be biased downwardly by spring means of little strength so that the rollers would always ride up over the sealing strips with no fear of causing local denting of the strips, in which case the reading on the gauge 103 would oscillate as the sealing strips passed the roller, but the minimum reading during each oscillation would indicate the clearance for that particular sealing strip. However, these sealing strips are of 14 gauge slightly tempered steel. Because of the ability to monitor closely the actual clearance, it is practical to operate the heat exchanger with smaller clearances than usual without any contact between the strip and the seal plate, so reducing gas leakage on the one hand and avoiding wear on the other hand.

By the maintenance of proper records, it will be possible to establish over an extended operating period the changes in the adjustments required at different operating temperatures, and any unusual adjustment will alert the operator to the possibility that some fault was developing in the rotor bearings, or in the attachment of the housing or other members.

By the present invention, the likelihood of serious damage to the air heater is considerably reduced, and any developing fault will become apparent while there is still time to close down the air heater before serious damage arises.

It will be appreciated by those skilled in the art that although the invention has been described as applied to an air heater with a rotor having a vertical axis, it can also be applied to other heat exchangers having horizontal axes.

The probes shown in the drawings are not all of the same configuration, and in particular the lengths of the pipes such as pipe 93 vary from place to place. It may be advantageous to provide a standard length of pipe, screwthreaded at one end so that an extension piece can be added as and when necessary. The "standard" probe can then be used at any desired location either with or without such an extension piece.

FIG. 14 illustrates an alternative construction for the upper end of the pipe 93 shown in FIG. 11. In FIG. 14, an upper part of the pipe carries an adaptor 150 using spring means in place of the resilient hose of FIG. 11. The adaptor includes a metal tube 201 having a parallel sided upper portion 201a, and having a lower portion with its sides cut away to leave two strap parts 201b. The two strap parts, which are slightly flexible, are held onto the top end of tube 93 by hose clamp 203. The upper portion 201a is capped with screw cap 205 which retains compression spring 207, this spring acting downwardly on a nut 209. Nut 209 is prevented from turning in portion 201a by a dowel 211 slidable in slot 213 extending along the side of portion 201a. Nut 209 receives a threaded portion of rod 215, which has a squared upper end 216 and a screwed connection at 217 to the rod 91. The spring 207 is stronger than spring 119 which acts upwardly on the plunger.

The adaptor 150 is used in similar manner to that of FIG. 11. Rotation of rod 215 by a spanner applied to end 216 causes the rod 215 and probe 91 to move downwardly, while nut 209 remains stationary and plunger 89 moves down compressing spring 119. The spring 207 however allows the nut 209 to rise slightly when roller 87 contacts a sealing strip.

I claim:
1. A probe for monitoring the clearance between the stationary and rotating parts of a rotary regenerative heat exchanger while in motion, said probe including:
   a housing suitable for mounting on a stationary part of the heat exchanger, the housing having a bore,
   a plunger slidable in said bore without rotation,
   a roller mounted on said plunger so that its curved surface projects beyond the end of said plunger,
   spring means acting on said plunger in such direction as to retract the roller relative to the housing, and
   adjustment means for resiliently moving the plunger a measurable distance against the force of said spring means to bring said roller into contact with a movable part of said heat exchanger while permitting slight movement of said roller when contacted by said movable part,
   and, wherein said adjustment means includes a tube mountable on said stationary part co-axial with said plunger and at the end of said plunger remote from the roller, a rod slidable in said tube and having a threaded portion, and screw threaded means received on said threaded portion and held non-rotatably relative to said tube by resilient means permitting slight movement of said screw threaded means with said rod in a direction away from said plunger, whereby said plunger may be moved towards the rotating part of the heat exchanger by rotation of said rod in said screw threaded means, said resilient means allowing slight movement of said roller when contacted by said rotating part, said slight movement being suitable for detection by sensing means.

2. A probe according to claim 1, wherein said screw threaded means is a nut non-rotatably held in an extension of said tube at the end thereof remote from the plunger.

3. A probe according to claim 1, wherein the end of said tube remote from the plunger carries mounting means for a gauge capable of measuring said measurable distance and of detecting said slight amount of movement caused by said roller contacting said rotating part.

* * * * *